D. C. WEYAND.
FARM TRACTOR.
APPLICATION FILED MAR. 21, 1918.

1,334,201.

Patented Mar. 16, 1920.
7 SHEETS—SHEET 1.

Fig. 1.

Inventor
D. C. Weyand.
By
Attorney

D. C. WEYAND.
FARM TRACTOR.
APPLICATION FILED MAR. 21, 1918.

1,334,201.

Patented Mar. 16, 1920.
7 SHEETS—SHEET 3.

Inventor
D. C. Weyand.

D. C. WEYAND.
FARM TRACTOR.
APPLICATION FILED MAR. 21, 1918.

1,334,201.

Patented Mar. 16, 1920.
7 SHEETS—SHEET 6.

Inventor
D. C. Weyand.
By A. J. Foor
Attorney

UNITED STATES PATENT OFFICE.

DALLAS C. WEYAND, OF GLENWOOD SPRINGS, COLORADO.

FARM-TRACTOR.

1,334,201.  Specification of Letters Patent.  Patented Mar. 16, 1920.

Application filed March 21, 1918. Serial No. 223,856.

*To all whom it may concern:*

Be it known that I, DALLAS C. WEYAND, a citizen of the United States, residing at Glenwood Springs, county of Garfield, and State of Colorado, have invented certain new and useful Improvements in Farm-Tractors; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in farm tractors, my object being to provide a construction of this class well adapted for field use, and to this end, provision is made for using the tractor for plowing and other farm work, whereby when the end of the field is reached it is not necessary to turn the machine around in order to travel in the opposite direction across the field. In the embodiment of the invention which is illustrated in the drawing and to which this specification will be more particularly directed, the machine is used for plowing. As illustrated, four plows are mounted on the frame work of the machine, two being normally idle and the other two active when the machine is in use in the field. These plows are pointed in opposite directions, one being used when the machine is traveling in one direction and the other pair when the machine is traveling in the opposite direction. Provision is made for elevating and supporting the inactive pair in proper position when idle and for lowering this pair as may be required.

My improved machine is provided with two tractor wheels, or wheels with relatively wide rims, which are out of alinement considered with reference to the direction of travel across the field when the machine is in use, their positions being such that while one wheel, namely, that which is foremost, travels in the last furrow on the plowed side of the field, the rear wheel travels in the last furrow on the land or unplowed side of the field. A third or side ground wheel is used for steering purposes and for giving the necessary side support to the structure on the land or unplowed side. Each of the tractor wheels is capable of such adjustment that at the end of the field it may be turned independently of the opposite tractor wheel to a position at right angles to its normal position when traveling across the field. This adjustment is made through the medium of a steering post and proper gearing connections, the frame upon which the traction wheel is mounted being rotatable within a rim stationary with the main frame work of the machine. After the traction wheel has been shifted to the adjusted position, the power is applied to the wheel, whereby it is caused to travel laterally a sufficient distance to shift the wheel which was foremost while making the last trip across the field, into a position which will make this wheel rearmost while traveling in the opposite direction. In this event, the wheel which was rearmost while making the last trip across the field will be foremost while making the next trip and will remain in the furrow which it occupied during the last trip, which furrow will be the last furrow on the plowed side of the field.

The mechanism whereby this adjustment is accomplished is a very important feature of the machine, and while the construction by a slight change may be adapted for use in plowing around or on four sides of a rectangular field, for instance, it is preferred to employ the apparatus as a two-way tractor, during which use it simply travels back and forth, the traction wheels being alternately forward and rearward wheels and each capable of adjustment at the end of the field for shifting the machine laterally, preparatory to the making of the next trip. The mechanism of each traction wheel is substantially the same as that of the other traction wheel. Hence, the description of the mechanism whereby one of these wheels is adjusted will be sufficient for both.

Having briefly outlined my improvement, I will proceed to describe the same in detail, reference being made to the accompanying drawing in which is illustrated an embodiment thereof. In this drawing.

The same reference characters indicate the same parts in all the views.

Let the numeral 5 designate the frame work of my improved machine which consists of two rims 6 connected by a frame structure of any suitable character. As shown in the drawing, a bar 7 is secured at its opposite extremities to both rims by suitable fastening devices 8. These rims are further connected by a bar 9 which at its opposite extremities is secured to the rims as shown at 10. Again, these rims are connected by a frame structure including bars 12, 13 and 14, the last named bars forming a support for the two sets of plows 15 which will be hereinafter more particularly described. Within each rim 6 of the frame work a gear wheel 16 is mounted to rotate, there being a ball bearing connection 17 between the rim 6 and the gear, such connection being made by angle members 18 and 19 respectively connected with the rim 6 and the gear 16, said angle members inclosing bearing balls 20 for antifrictional purposes. The gear 16 is cogged or toothed on its upper edge, as shown at 21. To each gear 16 is applied interiorly two bars 22 and 23, their extremities being secured to the gear, as shown at 24. Secured to these bars 22 and 23, and extending downwardly therefrom are spaced hangers 25 in which are journaled the opposite extremities of a shaft or axle 26 upon which a traction wheel 27 is mounted and secured, the hub 28 of the wheel being connected with the rim by spokes 29. By reason of the fact that there are two tractor wheels, as heretofore indicated of substantially the same construction, and which alternately become forward and rearward wheels depending on the direction of travel, the frame work of the structure as heretofore outlined, is supported above the ground and in proper position for the mounting of the engine or motor 30 as well as the other structure hereinafter described.

Figures 8, 9:
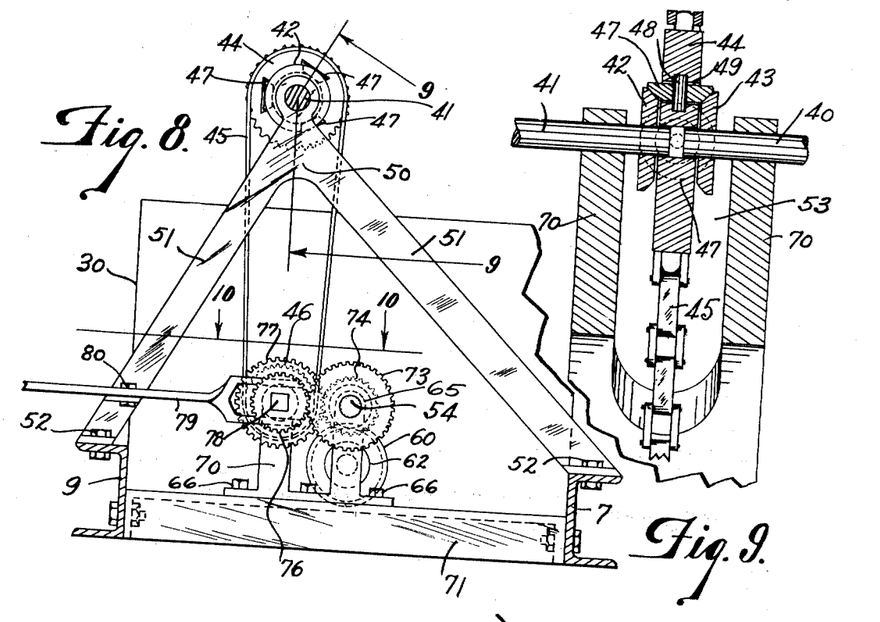
Fig. 8 is a section taken on the line 8—8, Fig. 1 viewed in the direction of the arrows, the parts being shown on a larger scale.
Fig. 9 is a section taken on the line 9—9, Fig. 8 shown on a still larger scale.

Extending upwardly from the bars 22 and 23 of each gear 16 are two angle brackets 31 which are connected by a housing member 32, this connection being made by suitable fastening devices 33. Within each housing member 32 are arranged two gear wheels 34 and 35, the gear wheel 34 being fast upon a short shaft 35', to which is also secured a worm wheel 36 inclosed in a top housing 37, the said worm wheel being arranged directly above the top of the housing 32, the housing 37 being movable with the wheel 36 and independently of the housing 32 when the structure is shifted at the end of the field preparatory to traveling in the opposite direction as hereinafter more fully described. There are two worm wheels 36, both of which are indicated by dotted lines in Fig. 1. These wheels coöperate with two worms 38 with which a shaft 39 is provided, this shaft being composed of two parts 40 and 41 (see Fig. 9), and respectively provided with bevel gears 42 and 43 which are fast on the said shaft members, the two shaft parts having their adjacent extremities loose in a sprocket wheel 44 which is connected by means of a chain 45 with a second sprocket wheel 46 which is geared to the engine shaft, as hereinafter more fully explained. The sprocket wheel 44 carries three bevel gears 47 which are positioned equi-distantly around the gears 43 with which they mesh, each gear 47 being mounted on a short shaft 48 whose extremities are anchored in the sprocket wheel, each shaft member 48 extending through an opening 49 formed in the sprocket wheel 44 and in which the corresponding gear or pinion 47 is located, each pinion 47 extending beyond the sprocket wheel on opposite sides and engaging in meshing relation the two gears 42 and 43. This is an ordinary transmission construction and is here utilized, for the purpose of actuating one of the shaft members 40 or 41 independently of the other shaft member while shifting the machine laterally at the end of the field, as hereinafter more fully described. The adjacent extremities of the two shaft members 40 and 41 are journaled in a V-shaped bracket 50 composed of two members 51 which diverge as they extend downwardly, their lower extremities being secured to the frame bars 7 and 9 as shown at 52, the upper portion of the bracket 50 being bifurcated, as shown at 53, to make room for the sprocket 44 and its gearing connections heretofore described.

The power is transmitted to the shaft 39 from the engine shaft 54 through the medium of mechanism which will now be described.

Figure 10:
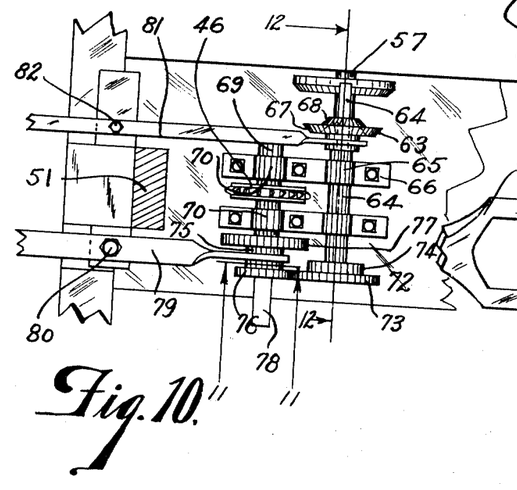
Fig. 10 is a section taken on the line 10—10, Fig. 8 looking downwardly.
Figure 11:
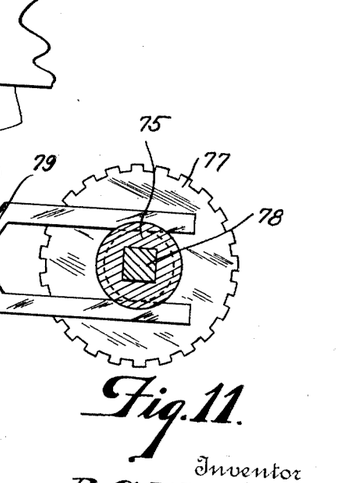
Fig. 11 is a section taken on the line 11—11, Fig. 10, the parts being shown on a much larger scale.
Figure 12:
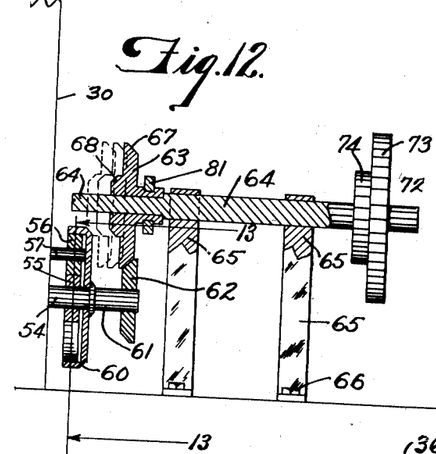
Fig. 12 is a section taken on the line 12—12, Fig. 10 looking toward the right.
Figure 13:
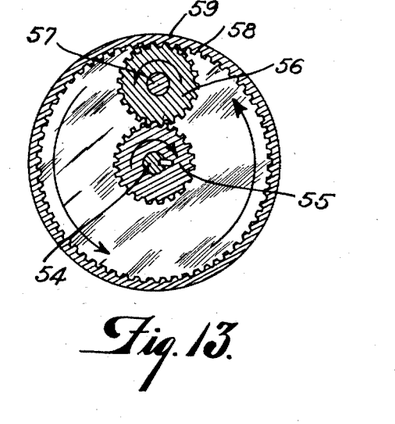
Fig. 13 is a section taken on the line 13—13, Fig. 12, looking toward the left, the parts being shown on a larger scale.

The engine shaft 54 carries a pinion 55, see Figs. 12 and 13, which meshes with a similar pinion 56 mounted on a stub shaft 57, the pinion 56 meshing with an interior cogged zone 58 of a gear 59 which is loose on the engine shaft and provided with an exterior bevel gear 60. The engine shaft is provided with an extension 61 beyond the gear 59, said extension carrying a fast pinion 62 adapted to mesh with a gear 63 splined on a shaft 64 journaled in uprights 65 which are secured, as shown at 66, to the stationary frame work of the machine carried by the frame bars 7 and 9. Any suitable frame work construction may, of course, be employed. The gear 63 has a cogged face 67 adapted to mesh with the adjacent cogged face of the gear 62. The gear 63 also has an integral smaller gear 68 adapted to mesh with the gear face of the gear 59 when the gear 63 is shifted to one of the dotted line positions, shown in Fig. 12, the other or broken line position of the gear 63 indicating the neutral position. When the gears 62 and 63 are in mesh, the shaft 64 is caused to rotate in one direction, while when the gear 68 is in mesh with the gear face 60 the shaft 64 is caused to rotate in the opposite direction. From the shaft 64 power is transmitted to a shaft 69 journaled in a support 70 and directly mounted on a frame bar 76 connecting the two frame bar members 7 and 9, (see Fig. 8). The shaft 69 is the shaft upon which the sprocket wheel 46 heretofore described, is mounted and through the medium of which power is transmitted to the shaft 39. The shaft 64 is provided with a gear 72 having a relatively large member 73 and an integral smaller member 74. The shaft 69 is provided with a gear 75 composed of a relatively small member 76 and a larger member 77. This gear 75 is applied to the square part 78 and the shaft 69 and is shiftable longitudinally thereon to cause its gear 76 to mesh with the gear 73 or to cause the gear member 77 to mesh with the gear member 74, as may be desired. When the two gear members 73 and 76 are in mesh, (see Fig. 10) the machine may be said to be in high gear, while when the gear members 77 and 74 are in mesh the machine may be said to be in low gear.

I will now describe the manner of transmitting power from the shaft 39 for operating the traction wheels. Attention is called to the fact that the gear 75 is shifted through the medium of a lever 79 fulcrumed at 80, while the gear 63 with its two gear faces 67 and 68 is shifted on the shaft 64 through the medium of a lever 81, fulcrumed as shown at 82, (see Fig. 10).

Figures 14, 15:
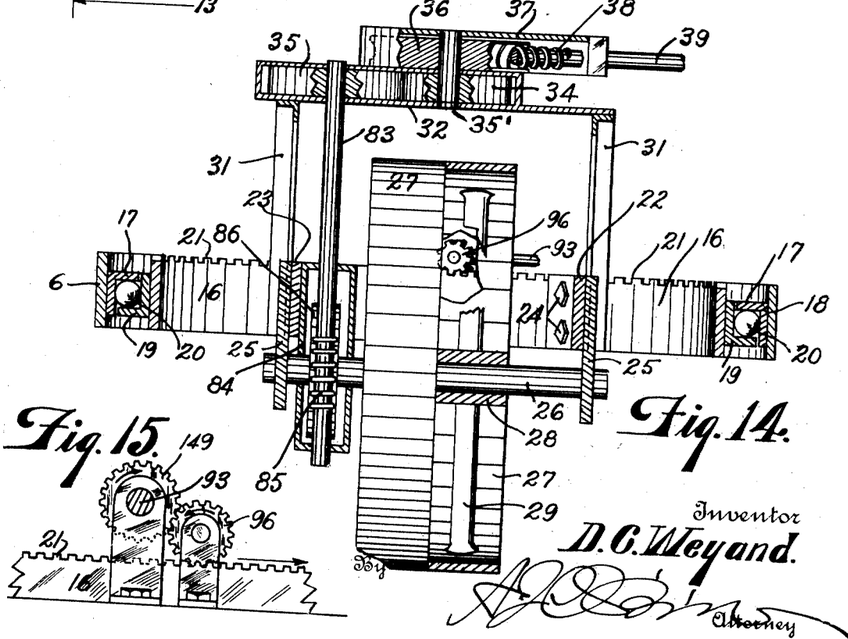
Fig. 14 is a section taken on the line 14—14 Fig. 1 looking toward the left, the parts being shown on a much larger scale.
Fig. 15 is a section taken on the line 15—15, Fig. 1 showing the parts on a larger scale and illustrating a gearing connection for adjusting one of the traction wheels in a direction opposite that required for two-way use, the construction shown in Fig. 15 being employed when plowing around the field as distinguished from back and forth.

The power transmitted to the shaft 39 is transmitted therefrom, first to the worm wheels 36 and the gears 34, and thence to the gears 35 which meshes with the gears 34 as heretofore explained (see Fig. 14). Each gear 35 (this mechanism at both ends of the machine being the same) is fast on a vertical shaft 83 which is journaled in the housing 32 at one extremity, its lower extremity being journaled in a housing 84 through which the axle 26 of the traction wheel 27 passes. The lower portion of the shaft 83 is provided with a worm 85 which coöperates with a worm wheel 86 fast on the axle 26. In this manner power is transmitted from the shaft 39 to each of the traction wheels 27 of the machine, and in this way the machine is propelled across the field.

The mechanism for shifting the forward extremity of the machine after it has reached one end of the field in order that this extremity may be the rear extremity on the return trip, will now be described.

A steering post or shaft 87 is journaled in a platform 88 and is provided at its lower extremity with a gear 89 which meshes with three gears 90, 91 and 92, the gear 90 being fast on one extremity of a shaft 93, the gear 91 being fast on the corresponding extremity of the shaft 94, while the gear 92 is fast on the corresponding extremity of the shaft 95. The two shafts 93 and 94 are substantially identical, their opposite extremities being each provided with a gear 96 which meshes with the cogged upper edge 21 of the corresponding gear 16. The two shafts 93 and 94 are alternately utilized in adjusting the machine at the end of the field for two-way work. Each of these shafts passes through a sleeve 97 having an upwardly projecting stem 98 which passes through the floor support 88, its upper extremity being provided with a head 99 adapted to receive the foot of the operator in order to move the shaft 93 downwardly a sufficient distance to disengage the gear 90 from the gear 89, in order to adjust but one of the traction wheels, namely the one that was in front in traveling across the field in one direction, preparatory to the beginning of the trip in the opposite direction. In order to normally maintain both gears 90 and 91 in mesh with the gear 89, each of these stems 98 is surrounded by a spiral spring 100 which is arranged between the head 99 and a stop collar 101.

Figure 1:
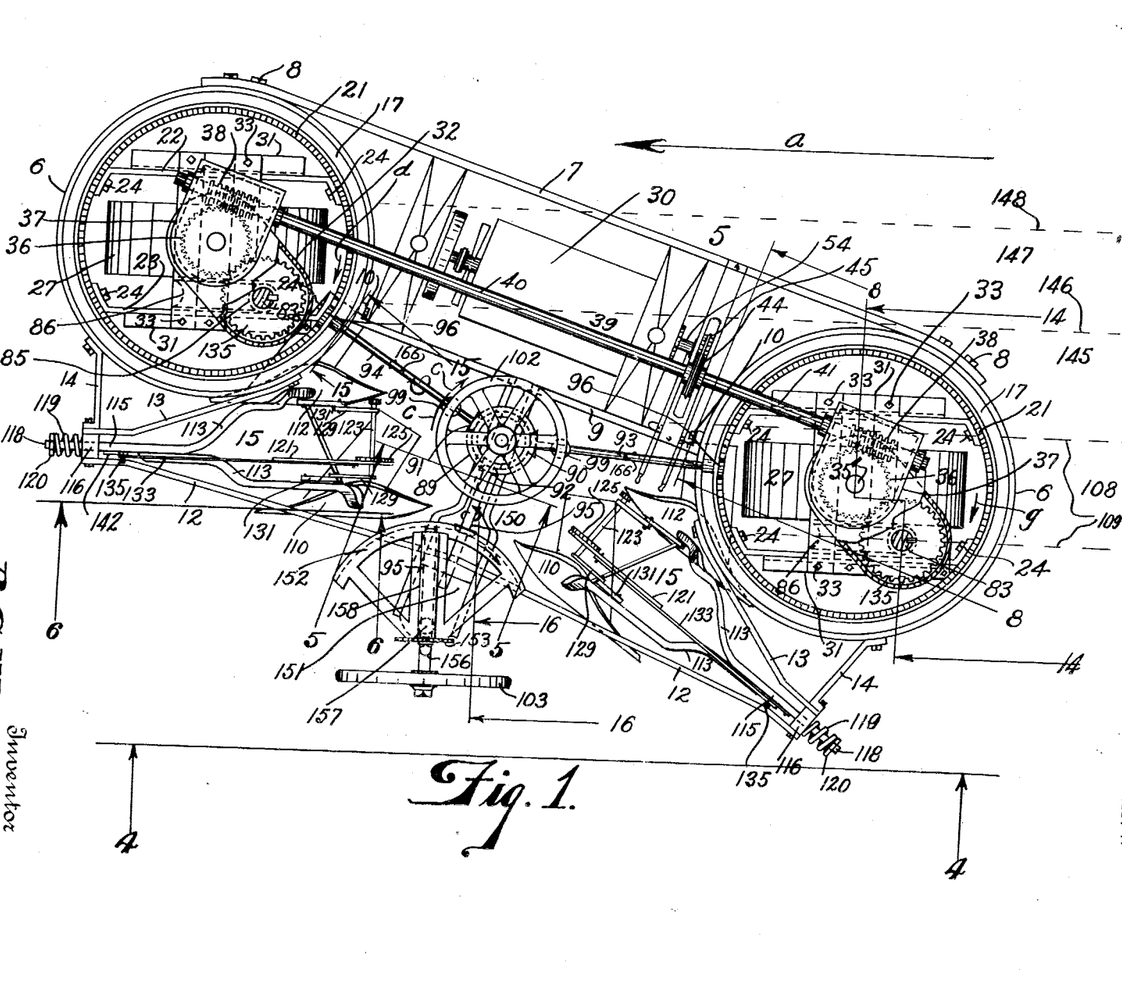
Figure 1 is a top or plan view of the machine in position for traveling across the field in the direction indicated by the arrow *a*.
Figures 2, 18:
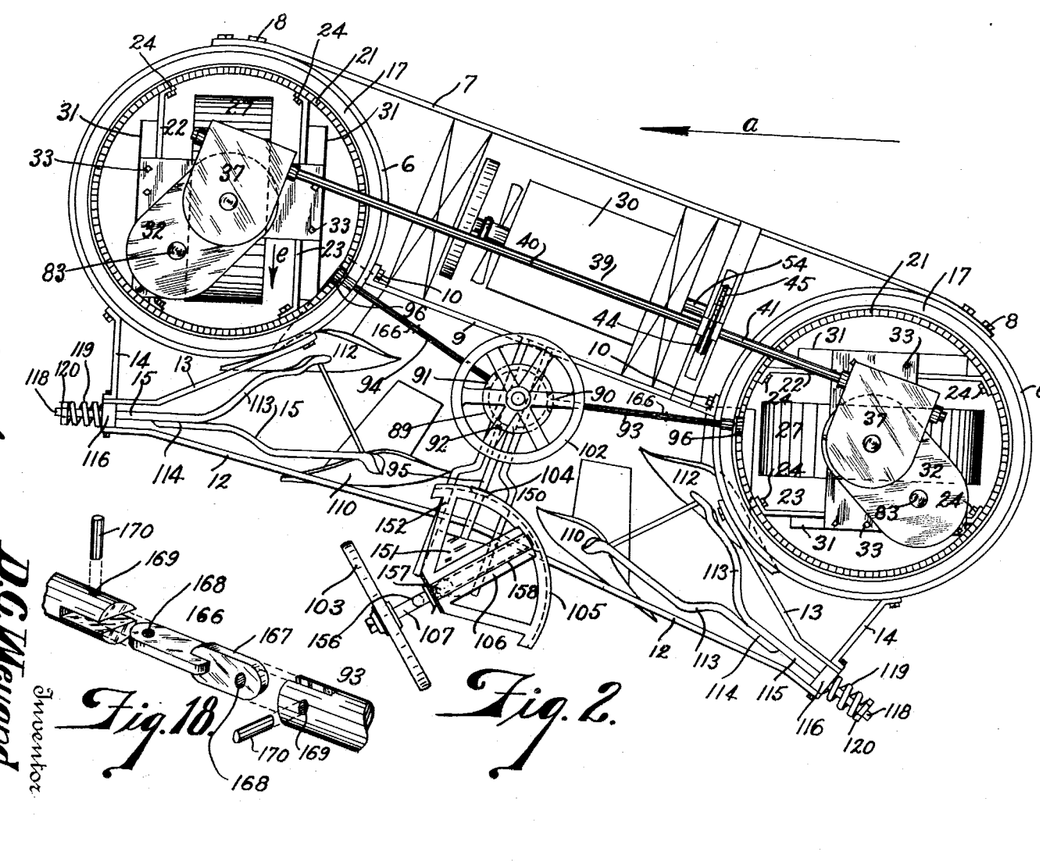
Fig. 2 is a similar view of the machine but showing the left hand traction wheel adjusted preparatory to shifting the machine as required at the end of the field in order that the adjusted wheel which was foremost while traveling in the direction of the arrow $a$ in Fig. 1 will be rearmost while traveling in the opposite direction.
Fig. 18 is a detail view illustrating the universal joint adapted for use in connection with certain shafts of the construction.

Now, if we assume that the gear 90 is disengaged from the gear 89 and that the machine is in the position shown in Fig. 1, if the steering wheel 102 which is fast on the upper extremity of the shaft 87 is rotated in the direction indicated by the arrow $c$ (see Fig. 1), the gear 96 meshing with the cogs 21 of the gear 16 which is farthest to the left in Fig. 1, the corresponding traction wheel 27 will be adjusted or changed from the position shown in Fig. 1 to the position shown in Fig. 2, or at right angles to its normal position when traveling across the field. This adjustment not only moves the gear 16 and the traction wheel, but also the entire frame structure which supports the traction wheel, the movement of the gear 16 being in the direction indicated by the arrow $d$ (see Fig. 1). When this adjustment is made and the traction wheel 27, shown at the left in Figs. 1 to 4 inclusive, is moved to the position shown in Fig. 2, the housing 32 in which the upper extremity of the corresponding worm shaft is journaled, is moved from the position shown in Fig. 1 to the position shown in Fig. 2, this housing simply turning around the axis of the short shaft 35 as a center. At the same time that the traction wheel 27, farthest to the left, is shifted from the position shown in Fig. 1 to the position shown in Fig. 2, a side wheel 103 is shifted from the position shown in Fig. 2 by virtue of the fact that the gear 92 transmits motion to the shaft 95 which in turn carries a gear 104 which meshes with a segmental gear 105 formed on and supported by a housing 106 in which is mounted a shaft or axle 107, which is supported by the side wheel 103, the latter being properly connected with the said shaft.

Figures 3, 16, 17:
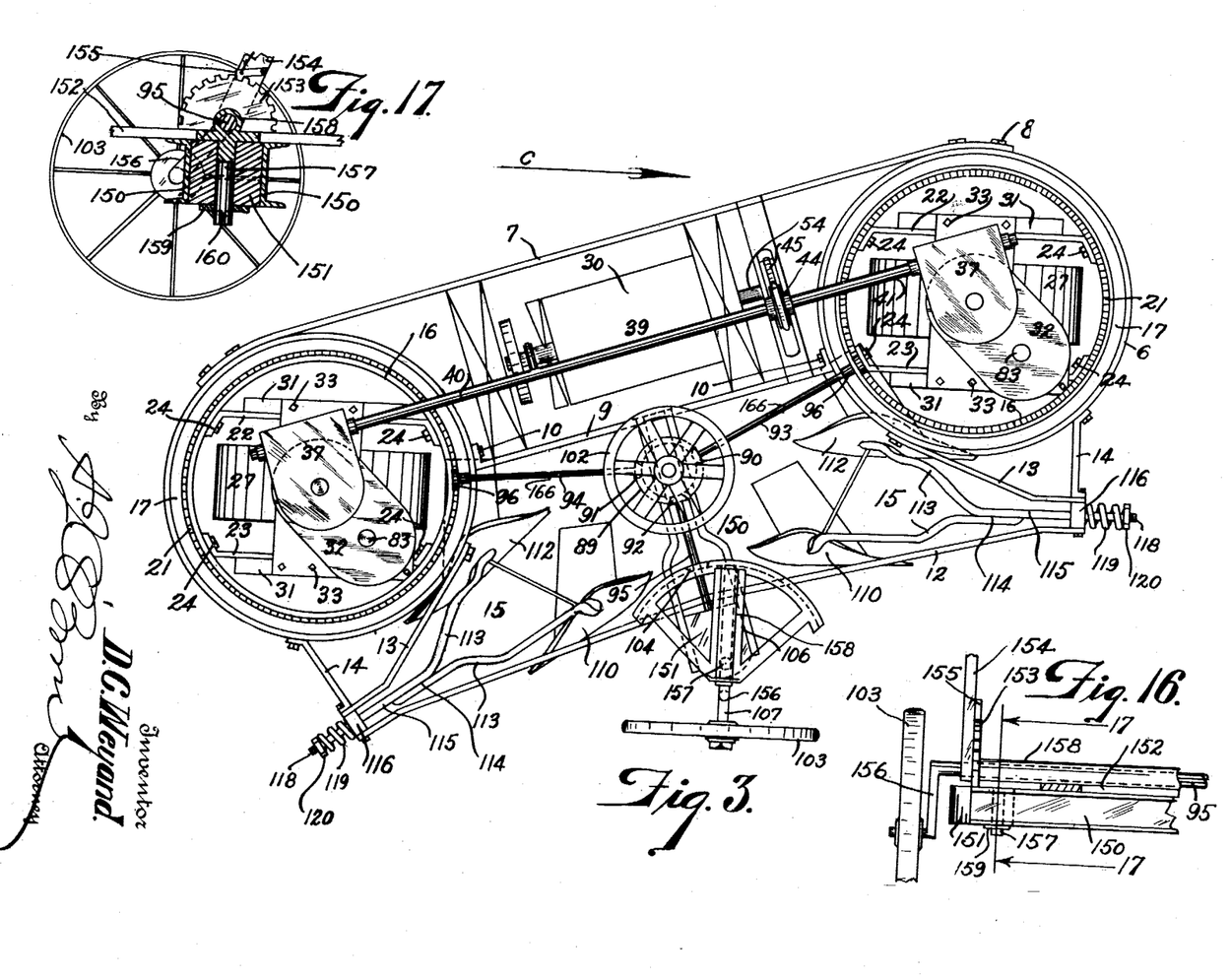
Fig. 3 is a view similar to Figs. 1 and 2, but showing the machine shifted for travel in the direction of the arrow $c$ or in the opposite direction from that shown in Fig. 1.
Fig. 16 is a view looking in the direction of arrows 16, Fig. 1, the parts illustrated being partly broken away.
Fig. 17 is a section taken on the line 17—17, Fig. 16, looking toward the left.

Now, after the traction wheel 27 is in the position shown in Fig. 2, the opposite traction wheel 27 being still in its normal position, if it is desired to shift the machine from the positions shown in Fig. 2 to that shown in Fig. 3, the engine is started and as the machine cannot travel in the direction indicated by the arrow $a$ in Figs. 1 and 2, by reason of the fact that one traction wheel 27 is in a position crosswise to such direction of travel, the resistance offered to the movement of the shaft member 40 will be so great that this shaft member will remain stationary and as the sprocket wheel 44 is rotated, the gears 47 will impart motion to the gear 42 and the shaft member 41 while the member 40 will remain stationary. This movement of the shaft member 41 will impart travel to the traction wheel 27 farther to the left in Figs. 1 to 4, in the direction indicated by the arrow $e$ (see Fig. 2), while the traction wheel 27 farther to the right will remain stationary or in the furrow 108 which is represented by the space between the two dotted lines 109. This operation will continue until the traction wheel 27 shown farther to the left in these views has traveled far enough to shift the frame work from the position shown in Figs. 1 and 2 to that shown in Fig. 3, after which the movement of the steering wheel will be reversed, whereby the traction wheel 27 at the left will be shifted into the position shown in Fig. 3 or into position to become the rear wheel when the machine is traveling across the field in the direction indicated by the arrows $c$ in Fig. 3. It will be understood that during the shifting of the traction wheel 27 farther to the left in Figs. 1 to 4, both sets of plows will be in the raised or elevated position idicated by the dotted lines in Figs. 6 and in full lines at the right of Fig. 4. The set of plows farther to the right in Figs. 1 to 4 will now be lowered into the plowing position and the traction wheel 27 farther to the left will travel in the furrow made by the plow on the land or unplowed side of the field, while the traction wheel 27 farther to the right will continue to travel in the last furrow made by the machine during the previous trip across the field or while traveling to the left referring to Figs. 1 to 4.

It will be understood that during the shifting of the machine from the position shown in Fig. 2 to that shown in Fig. 3, the top housing member 37 farther to the right will necessarily be moved from the position shown in Fig. 2 to that shown in Fig. 3, as soon as the direction of the shaft 39 is changed.

The two sets of plows, each of which in its entirety is indicated by the numeral 15 are each composed of two individual members 110 and 112, each being directly connected with a beam 113, these two members being connected at 114, and one of them merging into a main beam member 115 which passes through a block 116 which is provided with an opening 117 for the purpose. Beyond the block 116 the beam member 115 is provided with an extension 118 surrounded by a spiral spring 119 which is arranged between the block and a tension nut 120. Each set of plows is raised and lowered through the medium of a hand lever 121 fulcrumed, as shown at 122, on a spindle 123 mounted in a suitable stationary support 124 and carrying a quadrant 125 which coöperates with the lever 121 through the medium of a spring pawl 126. This lever is formed circular at its fulcrumed extremity as shown at 127, a circular part having an opening 128 through which a link 129 passes, said link being pivotally connected with the spindle 123 at one end and pivotally connected at its opposite extremity, as shown at 130, with one extremity of the link 131, the opposite extremity of the last named link being pivotally connected, as shown at 132 with the plow beam 113. Attention is called to the fact that there are two sets of links 129 and 131 for each set of plows and that each of the links 131 is connected, as shown at 132, with one of the plow beams. This is best illustrated in Fig. 1 but on a smaller scale. Furthermore, a link or connecting rod 133 is pivotally connected at one end, as shown at 134, with the hand lever 121, while the opposite extremity of the rod 133 is pivotally connected, as shown at 135, with a lever 136 which is fulcrumed, as shown at 137, on the bar 12 of the frame work. This lever has an arm 138 with which the rod 133 is connected and an arm 139 which extends on the opposite side of the fulcrum from the arm 138, the arm 139 being pivotally connected, as shown at 140 with one extremity of a link 141, the opposite extremity of the link being pivotally connected as shown at 142 with the plow beam member 115.

Figures 6, 7:
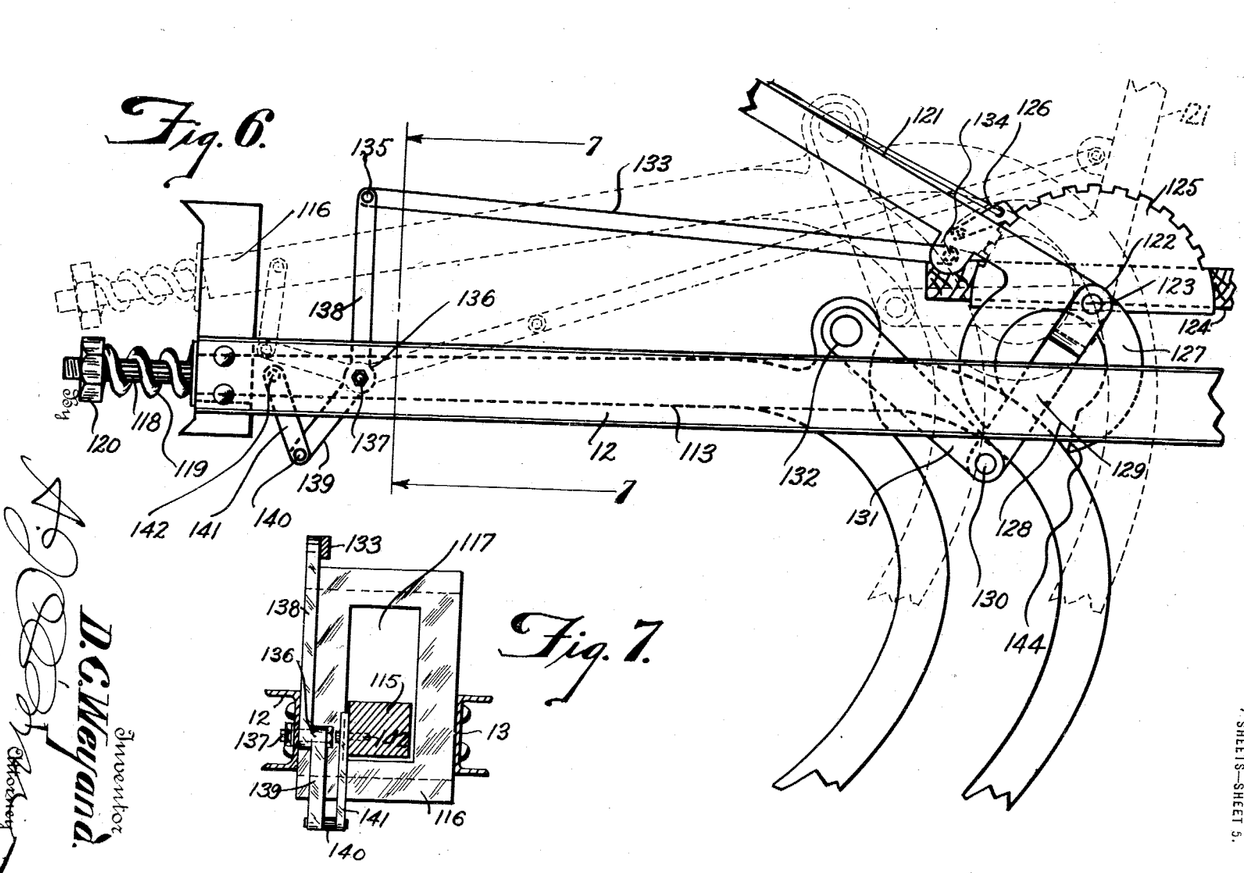
Fig. 6 is a section taken on the line 6—6, Fig. 1, the parts being shown on a much larger scale and in two different positions, one in full and the other in dotted lines. This view illustrates the vertical adjustment of the plows.
Fig. 7 is a section taken on the line 7—7, Fig. 6 looking toward the left.

Now, when it is desired to raise a set of plows from the lowered or full line position shown in Fig. 6, the hand lever 121 is thrown from the full line position in the same figure to the dotted line position. In the first instance, the lever will turn on its fulcrum spindle 123, but shortly thereafter the extremity 144 of the circular part 127 will engage the link 129 and as the movement of the lever is continued, the two links 129 and 131 will be thrown to the positions indicated by dotted lines and the plows, together with their beam members 113 and 115 will be thrown to the position indicated by dotted lines in Fig. 6, the other parts of the adjusting mechanism taking corresponding positions as also indicated by dotted lines in the same view.

Figure 4:
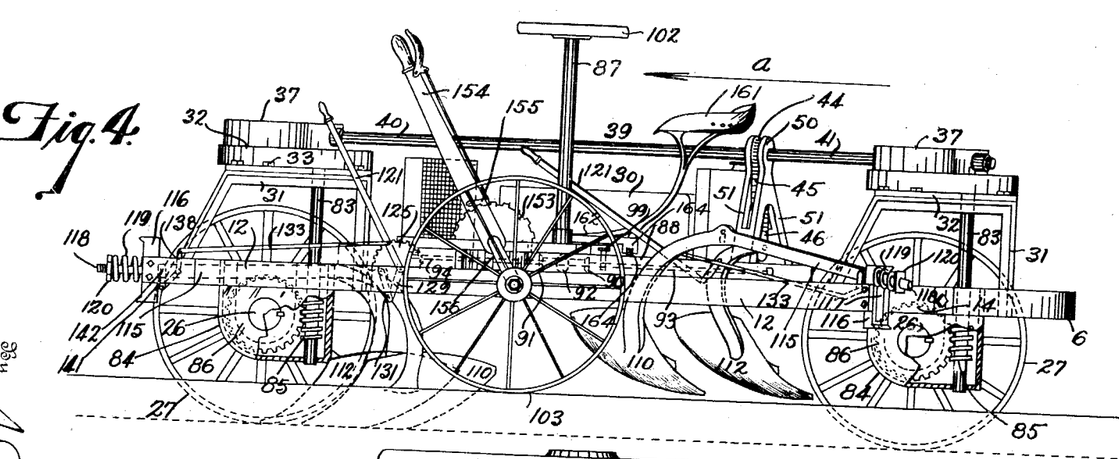
Fig. 4 is a side elevation of the machine, or a view looking in the direction of arrows 4, Fig. 1.

From the foregoing description the use and operation of my improved tractor as thus far described will be readily understood. Assuming that the machine is traveling across the field in the direction indicated by arrow $a$ in Figs. 1, 2 and 4, the two plows 110 and 112 are lowered and forming two furrows, one of them being already designated 108 between two dotted lines 109, the other being designated 145 between one of the dotted lines 109 and a dotted line 146. A third furrow may be designated 147 which is between the dotted line 146 and another dotted line 148 (see Fig. 1). In this event the traction wheel 27 farther to the left will be foremost and will occupy the furrow 147 which is the last furrow made by the plow previous to this particular trip. Consequently, the furrow 147 is open to receive the left hand traction wheel 27, while the rear traction wheel 27 travels in the furrow 108. During this time the rear set of plows is raised, as best indicated in Fig. 4. Now, as soon as the left hand extremity of the field is reached, the engine will be stopped and the forward set of plows will be raised. The forward or left hand traction wheel 27 will then be shifted from the position shown in Fig. 1 to the position shown in Fig. 2 by manipulating the steering shaft 87 through the medium of the hand wheel 102, the gear 90 being first disconnected from the steering shaft gear 89. As soon as this adjustment is made, the engine will be started and the left hand traction wheel 27 will be caused to travel laterally at right angles to the direction of travel across the field until the frame work of the structure is shifted to the position shown in Fig. 3, after which the left hand traction wheel will be adjusted to the position shown in Fig. 3 by manipulating the steering shaft, and through the medium of the shaft 94 and its connections with the left hand gear 22 and the steering shaft gear 89, the steering shaft being turned in a direction the reverse of that required to shift the gear from the position shown in Fig. 1 to that shown in Fig. 2. It should be noted that in shifting either traction wheel, as heretofore described, one of the gears 90 or 91 must be disconnected from the gear 89 of the steering shaft. Assuming that the machine is now in the position shown in Fig. 3, the left hand set of plows is lowered and the engine started, in which event the machine will travel across the field in the direction indicated by the arrows $c$. Should it be desired to travel around the field instead of back and forth it will be necessary to use an additional gear 149 (see Fig. 15) which meshes with the gear 96 which in turn meshes with the gear 16, in order to cause the rear traction wheel to turn in the opposite direction from that indicated by the arrow $d$ in Fig. 1, and to cause the forward traction wheel 27 to turn in the opposite direction or in the direction indicated by the arrow *g* in Fig. 1. In this event the rear shaft 93 or 94 would carry a gear 149, the latter meshing with a gear 96 which would be mounted independently of the shaft and mesh with the corresponding gear 16. Hence, it would only be necessary in traveling around the field instead of back and forth to apply a gear 149 to the rear shaft 93 or 94 in place of a gear 96, the latter being mounted independently of the shaft and meshing with the coöperating gear 16. In this form of construction both traction wheels 27 would be simultaneously turned on the vertical axes of the frames in which they are mounted, but in opposite directions.

In further explanation of the structure with which the side wheel 103 is connected, I will explain that the housing member 106 with which the segmental gear 104 is connected and in which the shaft 95 is journaled, is pivotally connected, as shown at 157 (see Figs. 16 and 17) with a frame structure 150 which extends laterally from the frame bar 9 and is further supported by the frame bar 12. The pivot or spindle 157 which as shown in Fig. 17, is formed integral with the structure 106 and a sleeve 158 of such structure in which the shaft 95 is directly journaled. This spindle is journaled in a block 151 carried by the frame 150, its lower extremity being perforated to receive a key 160 which is arranged below a washer 159. The shaft 95 is provided at its outer extremity with a crank 156 upon the free extremity of which the side wheel 103 is journaled. This shaft 95 is rotatably adjustable for the purpose of raising and lowering the wheel 103 in order that its normal vertical position may vary with the depth of the furrows made by the plows. It will be understood, that this wheel travels on the land or unplowed side or portion of the field, and consequently, the portion of its tread which engages the ground is always more elevated than the corresponding portions of the tractions wheels' treads which run in furrows, as heretofore explained. Consequently, as the depth of the furrows varies, it will be necessary to vary the vertical position of the side wheel 103. This can be accomplished, as will be readily understood, by the rotatable adjustment of the shaft 95 in its bearing 158, which adjustment can be made through the medium of a hand lever 154 carrying a pawl 155 coöperating with the quadrant 153 which is mounted to travel with the segmental gear 104 and the other parts of the housing structure in which the shaft 95 is journaled, as they are shifted horizontally on the frame member 150. From this it will be understood that while the shaft 95 is journaled in the bearing 158, this shaft or crank axle of the side wheel 103 is normally locked against rotation, since the lever 154 is fast thereon and locked by the engagement of the pawl 155 with the quadrant 153. Hence, it is evident that the side wheel 103 is journaled on the pin of the crank 156.

Attention is called to the fact that while I have shown sets of plows, each set consisting of two members, sets may be employed consisting of any desired number that it may be practicable or advisable to use, since the invention is not limited to any particular number of plows for each set. It should also be explained that apparatus other than plows may be used in connection with my improved tractor, though it is well adapted for carrying plows arranged as illustrated in the drawing, for two-way work. Of course, when plowing around a rectangular field for instance, it will only be necessary to employ one set of plows, since the set at one end of the machine would always be forwardly located with reference to the direction of travel.

I wish to state further that the shafts 93 and 94 are so mounted that they may be depressed through the medium of the stems 98 sufficiently to disengage their gears 90 and 91 from the steering shaft gear 89. If necessary a universal joint could be interposed in each shaft, but this is not thought necessary in view of the fact that when either gear 90 or 91 is depressed the entire corresponding shaft as well as the gear 96 is inactive. In fact, the adjustment stated is effected for the purpose of rendering the gear 90 or 91 and its connections inoperative, while the other or companion gear and its connections are actuated. Hence, a joint may be made in either shaft 93 or 94 or the same may be mounted in any manner that may be found commercially practicable.

In the drawing I have shown each shaft 93 and 94 provided with a universal joint 166 (see Figs. 1, 2, 3 and 18). In the last named figure this joint is shown in detail and on a larger scale, the parts being separated but in position to be assembled. In this view the numeral 167 indicates an integral link having parts flattened at right angles to each other and having perforations 168 arranged to coöperate with similar perforations 169 formed in the interlocking parts of the shaft 93 or 94 as the case may be, the link 167 being connected with the two parts of the shaft by pins 170.

Figure 5:
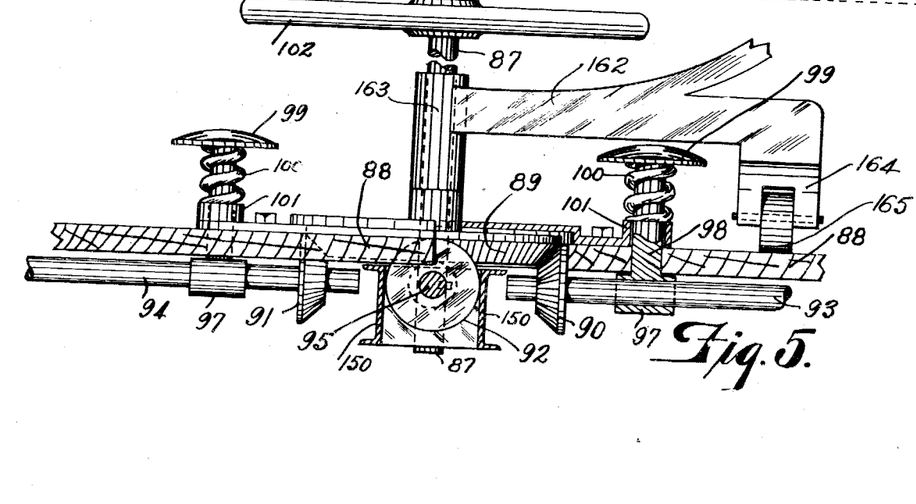
Fig. 5 is a section taken on the line 5—5, Fig. 1 viewed in the direction of the arrows adjacent said line, the parts being shown on a much larger scale.

I will further explain that the user of the machine will occupy a seat 161 which extends upwardly from a frame 162 which is connected with a sleeve 163 journaled on the steering shaft 87. This frame 162 has a depending part 164 carrying a wheel 165 which rests upon the platform member 88. Hence, the frame 162 and the seat carried thereby (see Figs. 4 and 5) may be turned around the steering shaft in order to properly position the seat for the travel of the machine in opposite directions as is required for two-way field work.

Having thus described my invention, what I claim is:

1. A tractor, including a main frame, auxiliary frames mounted to rotate on the main frame, traction wheels mounted to rotate in the auxiliary frames, gears on the auxiliary frames, a steering shaft, other shafts leading from the steering shaft to the gears of the respective auxiliary frames, one extremity of each other shaft being connected in operative relation with the steering shaft, while the other extremities of the said shafts are respectively connected in operative relation with the gears on the auxiliary frames, the connections between the shafts and gears being such that, normally, in the act of steering the traction wheels are maintained in parallelism.

2. A machine of the class described, including a main frame, three wheels occupying respectively front, rear and intermediate positions relatively to one another, auxiliary frames respectively mounted on the main frame to revolve on vertical axes, certain of said wheels being respectively mounted in the auxiliary frames to rotate on horizontal axes, the auxiliary frames being each provided with gears, a steering shaft, other shafts extending from the steering shaft to the respective gears of the auxiliary frames, and operative connections between the other shafts and the steering shaft, and also between the other shafts and the gears of the auxiliary frames, the connections between the shafts and gears being such that, normally, in the act of steering the traction wheels are maintained in parallelism.

3. A tractor, including a main frame, a front and a rear circular track on said frame, a circular auxiliary frame mounted to rotate on each of said tracks, a tractor wheel journaled in each auxiliary frame, a gear formed on the circle of each of said circular auxiliary frames, a steering shaft connection and a gear thereon to mesh with each of said gears on said frames, whereby said tractor wheels may be turned to any desired angle, the connections between the shafts and gears being such that, normally, in the act of steering the traction wheels are maintained in parallelism.

4. A tractor, including a main frame, a front and a rear circular track on said frame, a circular auxiliary frame mounted to rotate on each of said tracks, a tractor wheel journaled in each auxiliary frame, a circular gear formed on each of said circular auxiliary frames, a steering shaft connection and a gear thereon to mesh with each of said circular gears, whereby said tractor wheels may be turned to any desired angle, the connections between the shafts and gears being such that, normally, in the act of steering the traction wheels are maintained in parallelism.

5. A tractor, comprising a main frame, rotatable auxiliary frames mounted thereon and carrying tractor wheels, steering means having a relatively stationary gear thereon, shafts extending from said gear to said auxiliary frames, gears on the ends of said shafts adjacent said stationary gear to mesh with said gear, said ends being mounted in movable bearings to disengage the gears thereon from said stationary gear, whereby said wheels may be either simultaneously or independently steered.

6. A tractor, comprising a main frame, rotatable auxiliary frames mounted thereon, tractor wheels mounted on the said auxiliary frames, a side wheel connected with said main frame, steering means having a relatively stationary gear thereon, shafts extending from said gear to said auxiliary frames and to said side wheel connection, gears on the ends of said shafts adjacent said stationary gear to mesh with said gear, said ends being mounted in movable bearings to disengage the gears thereon from said stationary gear, whereby said wheels may be steered simultaneously, or any one, or any two, of said wheels may be steered alone.

7. A tractor, comprising a main frame, rotatable auxiliary frames mounted thereon, tractor wheels mounted on said auxiliary frame, a side wheel connected with the main frame, steering means extending to each of said auxiliary frames and to said side wheel connection, said steering means including means for selectively steering any one or more of said wheels, or for simultaneously steering all of said wheels.

8. A tractor, including a main frame, front and rear circular tracks on said frame, a circular auxiliary frame mounted to rotate on each of said tracks, a tractor wheel on each auxiliary frame, draft connections extending from each of said tracks, and means extending longitudinally of the machine and connecting said draft connections.

9. A tractor, including a main frame, front and rear circular tracks on said frame, a circular auxiliary frame mounted to rotate on each of said tracks, a tractor wheel on each auxiliary frame, a short connection at one side of each of said circular tracks, means connected with said short connections and extending longitudinally of the machine, and draft connections at the joint between said short connections and said longitudinally extending means.

10. A tractor, including a main frame, front and rear circular tracks on said frame, a circular auxiliary frame mounted to rotate on each of said tracks, a tractor wheel on each auxiliary frame, a short connection at one side of each of said circular tracks, means connected with said short connections and extending longitudinally of the machine, and draft connections at the joint between said short connections and said longitudinally extending means, said draft connections thereby being located closely adjacent said tracks and the corresponding tractor wheels.

11. A tractor, including a main frame, front and rear circular tracks on said frame, a circular auxiliary frame mounted to rotate on each of said tracks, a tractor wheel on each auxiliary frame, a short connection at one side of each of said circular tracks, means connected with said short connections and extending longitudinally of the machine, draft connections at the joint between said short connections and said longitudinally extending means, said draft connections thereby being located closely adjacent said tracks and the corresponding tractor wheels, and an intermediate side wheel operatively connected with said longitudinally extending means.

12. A tractor, including a main frame, tractor wheels mounted on the opposite ends of said frame, draft connections mounted closely adjacent each of said tractor wheels, the connections being located one at each end of the main frame, the two connections being located also at one and the same side of the adjacent traction wheels, the operative draft connection being in each instance the one adjacent the forward tractor wheel, so that plows, when attached to the draft connections, will have their toes directed toward the adjacent ends of the frame and the toe of each plow closely adjacent the lead tractor wheel.

13. A tractor, including a main frame, a circular track mounted on opposite ends of said frame, auxiliary frames adapted to rotate on said tracks, tractor wheels mounted in said frame, draft connections mounted closely adjacent each of said tracks, the connections being located one at each end of the main frame, the two connections being located also at one and the same side of the adjacent traction wheels, the operative draft connection being in each instance the one adjacent the forward tractor wheel, so that plows, when attached to the draft connections, will have their toes directed toward the adjacent ends of the frame and the toe of each plow closely adjacent the lead tractor wheel.

14. A trator, including a main frame, circular tracks mounted on opposite ends of said frame, auxiliary frames mounted to rotate on said tracks, tractor wheels positioned in said frames, a draft connection slightly spaced from and operatively connected with each of said circular tracks, the connections being located one at each end of the main frame, the two connections being located also at one and the same side of the adjacent traction wheels, the operative draft connections being in each instance the one adjacent the forward tractor wheel, so that plows, when attached to the draft connections, will have their toes directed toward the adjacent ends of the frame and the toe of each plow closely adjacent the lead tractor wheel.

In testimony whereof I affix my signature.

DALLAS C. WEYAND.